United States Patent Office 3,462,588
Patented Aug. 19, 1969

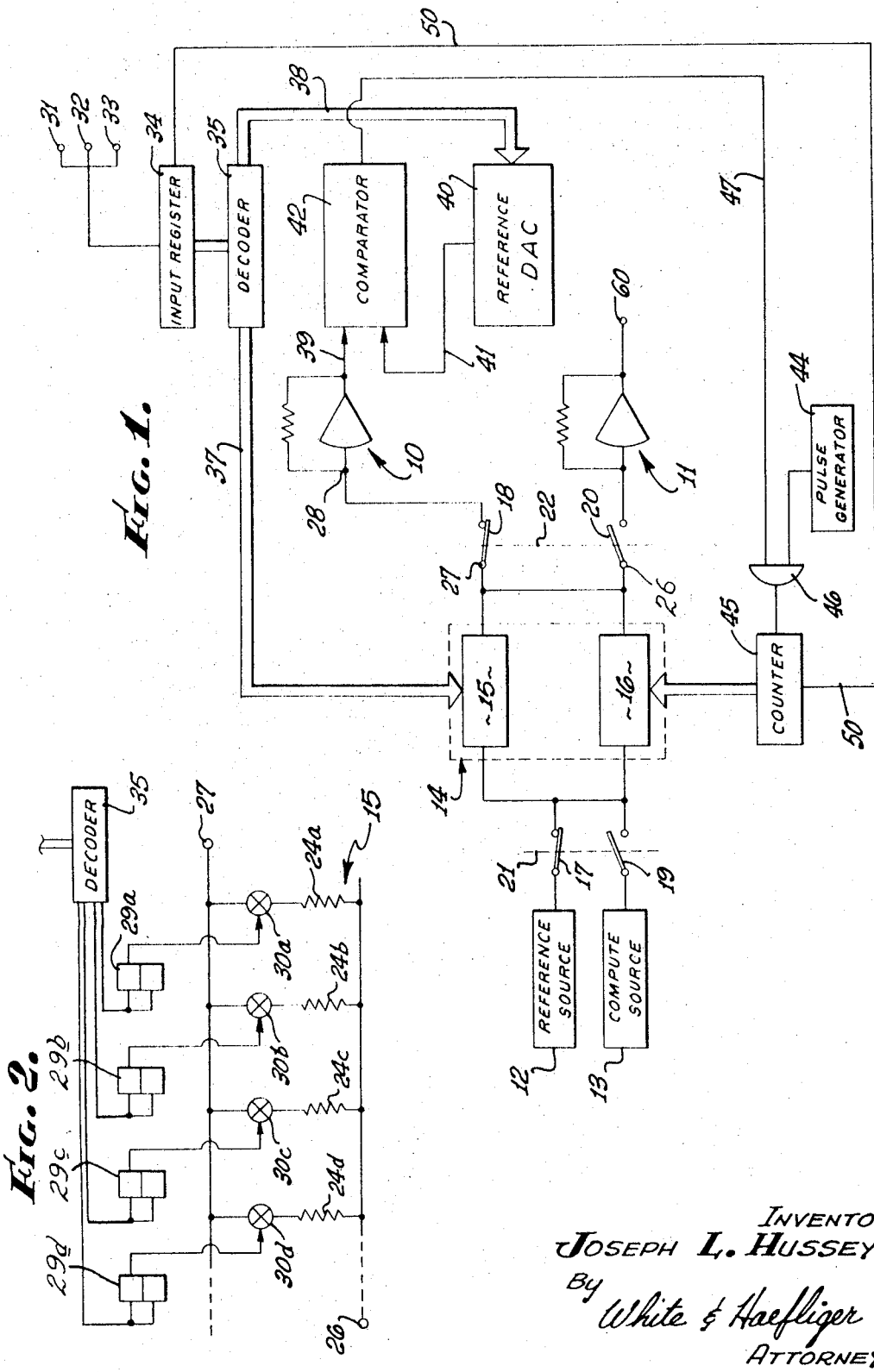

3,462,588
DIGITAL ATTENUATOR WHICH CONTROLS A VARIABLE CONDUCTANCE
Joseph L. Hussey, Tustin, Calif., assignor to Astrodata, Inc., Anaheim, Calif., a corporation of California
Filed Feb. 17, 1966, Ser. No. 528,293
Int. Cl. G06g 7/26
U.S. Cl. 235—150.53                5 Claims

ABSTRACT OF THE DISCLOSURE

The disclosure concerns a precision digital attenuator wherein a variable conductance is controlled in two sections. One section, associated with the most significant value is switched open loop; the other section is in a closed loop and is used to provide the conductance of the least significant value and to correct for any errors in the total conductance value.

---

This invention relates generally to computers, and more specifically relates to improvements in analog computers.

Analog computers typically have what are known as "set" and "compute" modes of operation. In compute mode, an input signal or voltage is applied to an attenuator network, usually comprising resistance elements, connected via a summing junction with a computing operational amplifier. The resistance of the attenuation network is adjusted prior to computing and in such manner as to effectively operate upon the input voltage in carrying out the analog computation. Selective adjustment of the attenuator resistance is effected during "set" mode, so as to result in desired computation during "compute" mode operation.

In the past, set mode adjustment of the attenuation network has typically been effected by means of a servo arrangement, wherein the wiper of a potentiometer in the attenuator network is motor driven toward null position in response to a command setting input corresponding to the desired setting of the attenuator resistance. For example, if compute voltage is to be divided by the number .6958, the servo system is operated to drive the potentiometer wiper arm until the effective resistance of the attenuator network closely approximates the value .6958. This process is relatively time consuming and therefore expensive, considering the fact that the network must be set many times during the solution of a problem, about two seconds typically being required to set the network prior to each compute operation. Also, the physical size of the potentiometers and drive motors required for desired accuracy of setting is highly objectionable. The potentiometer may be hand set instead of motor driven, but this too is unsatisfactory and even more time consuming.

It is a major object of the present invention to overcome the above problems as well as others associated with analog computers, through the provision of an unusually advantageous digital attenuator that may be set up very rapidly and accurately. The attenuator is adapted for combination with a "set mode" operational amplifier, and it basically comprises a reference input voltage receiving network having primary resistance elements and secondary resistance elements selectively connectible in series with the amplifier input; first means responsive to a more significant digit portion of a "setting" digital input to effect connection of corresponding primary resistance elements in attenuating relation with the amplifier input; and second means responsive to the digital input and to the amplifier output to effect connection of secondary resistance elements in attenuating relation with the amplifier input, so that the thus connected elements of both primary and secondary resistance attenuate the reference input in correspondence with the digital input.

Typically, the digital input version is supplied via an input register and decoder, as will be described. Also, the first means referred to above may typically include a primary register having bi-stable devices connected to respond to the more significant digit portion of the digital input version in the form of multiple bits, and switches connected to be operable in response to change of state of the devices and to control the connection of the primary resistance elements in current attenuating relation with the set mode amplifier input.

The second means referred to above may typically include a digital to analog converter connected to convert the digital input version to an analog output, and a comparator connected to provide an enabling output indicating the existence of a difference between the analog output and the set mode amplifier output. Such second means may also include a pulse generator and counter, means responsive to the enabling output of the comparator to effect application of the generator output to the counter, and a secondary register connected to be driven by the counter and to control the connection of the secondary resistance elements in series with the set mode amplifier input.

These and other objects and advantages of the invention, as well as the details of illustrative embodiments, will be more fully understood from the following detailed description of the drawings, in which:

FIG. 1 is a block diagram showing one preferred form of the attenuator in its environment; and FIG. 2 is a circuit diagram showing a portion of the attenuator.

In FIG. 1, set mode and compute mode operational amplifiers are indicated at 10 and 11, and the numerals 12 and 13 respectively indicate sources of reference voltage and compute voltage.

A reference input receiving network generally indicated at 14 may be considered as having primary resistance elements incorporated within branch 15 and secondary resistance elements incorporated within branch 16. The apparatus is shown as connected in "set" mode, with network 14 connected in series between the reference voltage source 12 and the input to amplifier 10 via switches or relays 17 and 18 which are closed. After completion of setting, the switches 17 and 18 are opened and switches 19 and 20 are closed, thereby to connect the attenuator network in series between the compute voltage source 13 and the compute amplifier 11. Switches 17 and 19 may be ganged at 21, and switches 18 and 20 ganged at 22.

Extending the description to FIG. 2, the branch 15 is shown to include primary resistance elements in the form of a BCD divider having parallel resistors 24a, 24b, 24c, 24d etc., the values of which may increase as follows:

| Resistors: | Units of resistance R |
|---|---|
| 24a | 1R |
| 24b | 2R |
| 24c | 4R |
| 24d | 8R |
| etc. | etc. |

In both FIGS. 1 and 2, the common input and output terminals of the attenuator branches are indicated at 26 and 27, the latter defining a summing junction.

Attenuator branch 15 may be considered to include what may be referred to as first means responsive to a more significant digit portion of a version of a digital input to effect connection of corresponding primary resistance elements in attenuating relation with the input at 28 to the set mode amplifier 10. Thus, for example, flip-flops 29a–29d may be provided as seen in FIG. 2 to open or close switches 30a–30d at switch resistors 24a–24d in or out of the network, the output current of the network summed at 27 being proportional to the two most significant digits of the selected voltage. In this regard, the digital input representing a number such as .6958 may be supplied to terminal 31 from a keyboard, or to terminals from punched tape or other input system, or to terminal 33 from a digital computer. The terminals are connected to an input register 34 for storage, the register output being decoded at 35 to develop pulse or bit train versions of the digital input. The two most significant digits .69 in the input register, after decoding at 35, are transmitted at 37 and stored in the bi-stable devices such as flip-flop 29 (or register of the attenuator) the latter register typically being an eight-bit BCD register. In this regard, switches 30 are connected to be responsive to change of state of the flip-flops.

The output of the BCD register divider network at 15 is then summed with the output from the resistor network in attenutor branch 16, and applied to the junction of the "set" amplifer 10. Branch 16 may be considered as incorporated in a so-called second means responsive to a version of the digital input (transmitted at 38) and to the set amplifier output (appearing at 39) to effect connection of secondary resistance elements (in branch 16) in attenuating relation with the amplifier input, all in such manner that primary and secondary resistance elements in attenuator branches 15 and 16 attenuate the reference input from source 12 in correspondence with the digital input. For example, if the reference input is to be divided by the number .6958 as set by the digital input, appropriate resistors in branches 15 and 16 are connected in attenuating relation with the reference input voltage to accomplish the division.

The above-mentioned second means may typically include a digital to analog converter, such as DAC 40, connected to convert the digital input version transmitted at 38 to an analog output appearing at 41. DAC 40 may be set when the input register 34 is loaded. Such second means may also include a comparator 42 connected to provide an enabling output indicating the existence of a difference between the analog output at 41 and the set mode amplifier output at 39. Thus, for example, the comparator output may go true if the inputs at 39 and 41 are unequal.

The above mentioned second means may also typically include a pulse generator indicated at 44, a counter seen at 45, and means responsive to the enabling (true) output at 47 of the comparator to effect application of the pulse output to the coutner. The latter means may for example include the two input AND gate 46. The branch 16 of the attenuator 14 typically includes a binary register incorporating flip-flops connected to be driven by the counter 45. The flip-flops are used to control switches in the same manner as described in connection with branch 15, the switches being used to switch secondary resistors into and out of the network in current attenuating relation with the set mode amplifier inputs. Secondary resistors control the least significant value conductances, corresponding for example to the .0058 portion of the value .6958.

In operation, a reset signal from the input register 34 is applied at 50 and sets the counter 45 to zero at the start of the "set" cycle. Accordingly, the attenuator is initially set (via branch 15) at a value (say .6900) that is lower than the desired value .6958. The comparator recognizes this and starts the counter, which then counts up to the desired setting .6958. At the desired setting, the comparator output goes false, thereby disabling the gate 46 and consequently the pulse drive to the counter. The comparator may also provide an "end of conversion" signal.

Typically, the counter 45 is an eight-bit counter, so that at the start of the setting process, the maximum difference between the desired setting and the contents of the eight-bit counter is 256 counts. This difference determines the setting time, since at a pulse frequency of 25 kilocycles, for example, the maximum setting time will be 10 milliseconds, in addition to the addressing time. Thus, the setting time is much less than in prior servo systems incorporating motor driven wiper arms.

Following setting, the switches 17 and 18 are opened and switches 19 and 20 closed, thereby to connect the set attenuator 14 between the compute voltage source 13 and the compute operational amplifier, the output of which appears at terminal 60.

I claim:

1. In a computer, the combination comprising a set mode operational amplifier, a reference input receiving network having primary resistance elements and secondary resistance elements selectively connectible in series with the amplifier input, first means connected with said primary resistance elements and including a primary register responsive to a more significant digit portion of a digital input to control the connection of corresponding primary resistance elements in attenuating relation with the amplifier input, and second means connected with said secondary resistance elements and responsive to said digital input and to the amplifier output to effect connection of secondary resistance elements in attenuating relation with the amplifier input so that the thus connected elements of both primary and secondary resistance attenuate the reference input in correspondence with the digital input, said second means including a digital to analog converter connected to convert said digital input to an analog output, a comparator providing an enabling output indicating the existence of a difference between said analog output and the set mode amplifier output, a pulse generator, a counter, means responsive to said enabling output to effect application of the pulse generator output to the counter, and a secondary register connected to be driven by the counter and to control the connection of the secondary resistance elements in current attenuating relation with the set mode amplifier input.

2. The combination of claim 1 including an input register to receive the digital input and decoder to decode the contents of the input register and provide said digital input version to said first and second means.

3. The combination of claim 1 including a compute mode operational amplifier, and means to selectively connect the output of said network with the input of said compute mode amplifier.

4. The combination of claim 1, in which said primary register has bi-stable devices connected to respond to said more significant digit portion of said digital input version in the form of multiple bits, and switches connected to be operable in response to change of state of said devices and to control the connection of the primary resistance elements in current attenuating relation with the set mode amplifier input.

5. The combination of claim 1, in which said secondary register includes secondary resistance element control switches connected to be operated in response to increasing count in said counter.

References Cited

UNITED STATES PATENTS

| | | | |
|---|---|---|---|
| 2,784,396 | 3/1957 | Kaiser et al. | 340—347 |
| 3,062,442 | 11/1962 | Bowensel et al. | 235—92 |
| 3,228,023 | 1/1966 | Hinrichs | 340—347 |
| 3,250,905 | 5/1966 | Schroeder et al. | 235—197 |
| 3,277,464 | 10/1966 | Naydam et al. | 340—347 |

MALCOLM A. MORRISON, Primary Examiner

J. F. RUDDIERO, Assistant Examiner

U.S. Cl. X.R.

235—197